United States Patent
Akita et al.

(10) Patent No.: US 7,345,387 B2
(45) Date of Patent: Mar. 18, 2008

(54) DYNAMOELECTRIC MACHINE

(75) Inventors: Hiroyuki Akita, Tokyo (JP); Keiichiro Oka, Tokyo (JP); Wakaki Miyaji, Tokyo (JP); Toshiaki Kashihara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/567,780

(22) PCT Filed: Aug. 9, 2004

(86) PCT No.: PCT/JP2004/011435

§ 371 (c)(1), (2), (4) Date: Feb. 9, 2006

(87) PCT Pub. No.: WO2006/016394

PCT Pub. Date: Feb. 16, 2006

(65) Prior Publication Data

US 2006/0261688 A1 Nov. 23, 2006

(51) Int. Cl.
*H02K 9/00* (2006.01)

(52) U.S. Cl. .......................................... 310/63; 310/64

(58) Field of Classification Search .................. 310/52, 310/54, 58, 64, 62, 63
See application file for complete search history.

(56) References Cited

U.S. PATENT DOCUMENTS

| | | | | |
|---|---|---|---|---|
| 5,763,968 | A * | 6/1998 | Hayashi et al. | 310/51 |
| 5,864,192 | A * | 1/1999 | Nagate et al. | 310/156.05 |
| 6,011,332 | A * | 1/2000 | Umeda et al. | 310/58 |
| 6,509,660 | B1 * | 1/2003 | Asao | 310/63 |
| 2003/0030334 | A1 * | 2/2003 | Vasilescu et al. | 310/62 |

FOREIGN PATENT DOCUMENTS

| | | | |
|---|---|---|---|
| EP | 0 779 697 | * | 12/1996 |
| JP | 9-154256 A | | 6/1997 |

* cited by examiner

*Primary Examiner*—Dang Le
*Assistant Examiner*—Nguyen N. Hanh
(74) *Attorney, Agent, or Firm*—Sughrue Mion, PLLC

(57) ABSTRACT

An automotive alternator in which a fan rotating together with a rotor to direct air from a suction aperture into a case, blow the air centrifugally, and discharge the air externally through a discharge aperture has a blade including an interposed portion extending axially from an end surface of a pole core between an adjacent pair of claw-shaped magnetic poles. For this reason, cooling of a rotor coil and a stator coil is improved by improving capacity of the fan in a limited space, thereby enabling output to be improved.

16 Claims, 6 Drawing Sheets

DYNAMOELECTRIC MACHINE

TECHNICAL FIELD

The present invention relates to a dynamoelectric machine in which a fan is mounted to an end surface of a Lundell rotor.

BACKGROUND ART

In automotive alternators using a Lundell rotor mounted with fans, cooling airflows are generated centrifugally by the fans together with rotation of the rotor to cool stator coil ends, brackets transmitting stator heat, etc. A rectifier and a regulator are also cooled by cooling airflows sucked in by the fans. Since these cooled bodies each have a heat resistance limit, if cooling is not achieved sufficiently, for example, the heat resistance limit may be exceeded, causing damage, and if that is to be prevented, it may be necessary to reduce flowing electric current values. In other words, electric current generated in the alternator must be suppressed, reducing output performance.

In environments surrounding automotive alternators, there has been a tendency in recent years for thermal environments to be high in temperature and severe due to factors such as rising ambient temperatures in engine compartments, increases in onboard electrical equipment, etc., accompanying reductions in engine compartment size, and high-density arrangement of peripheral parts in engine compartments, etc.

In addition, in order to meet demands for compact size, light weight, and high output that are sought in automotive alternators, automotive alternators show a tendency toward size reduction, which leads to reductions in cooling fan diameters, but there is a possibility that this may be accompanied by deterioration in automotive alternator cooling due to reductions in cooling airflow rate, and there is an urgent need to achieve improvements in automotive dynamoelectric cooling to overcome these problems.

In answer to demands of this kind, alternators are known in which cooling efficiency is improved by combining a front-end cooling fan having oblique-flow blades and a rear-end cooling fan having centrifugal blades, fixing the rear-end cooling fan to an end surface of a Lundell pole core away from a pulley, fixing the front-end cooling fan to an end surface of the pole core near the pulley, and selecting oblique-flow blades having an optimal shape (See Patent Literature 1, for example).

Patent Literature 1
  Japanese Patent Laid-Open No. HEI 09-154256 (Gazette)

However, In an automotive alternator of the above configuration, settings are required that place importance on better cooling in response to increases in the amount of heat generated by electrical components such as three-phase stator coils, rotor coils, etc., in order to adapt to compact size and high output, but cooling airflow rate cannot be made to catch up merely by optimizing the shape of the oblique-flow blades of the front-end cooling fan, and means for increasing the airflow rate must inevitably be considered.

Conceivable examples of means for improving the cooling airflow rate include increasing the number of oblique-flow blades in the cooling fan, and increasing the area of the oblique-flow blades, etc., but in manufacturing methods involving press-forming ferrous metal plates, etc., since a plurality of oblique-flow blades are cut and raise from a single sheet of generally disk-shaped base material, increasing the number of blades and increasing the area of the blades conflict with each other, and one problem has been that normally the number of blades and the area of the blades must be selected by making a certain trade off, making it extremely difficult to achieve both improvements in output and reductions in size in automotive alternators.

DISCLOSURE OF INVENTION

The present invention aims to solve the above problems and an object of the present invention is to provide a dynamoelectric machine enabling output to be improved by improving capacity of a fan in a limited space so as to improve cooling of a rotor coil and a stator coil.

In order to achieve the above object, according to one aspect of the present invention, there is provided a dynamoelectric machine in which a fan rotating together with a rotor to direct air from a suction aperture into a case, blow the air centrifugally, and discharge the air externally through a discharge aperture has a blade including an interposed portion extending axially from an end surface of a pole core between an adjacent pair of claw-shaped magnetic poles.

Using a dynamoelectric machine according to the present invention, cooling of a rotor coil and a stator coil is improved by improving capacity of the fan in a limited space, thereby enabling output to be improved.

BEST MODE FOR CARRYING OUT THE INVENTION

Figure 1:
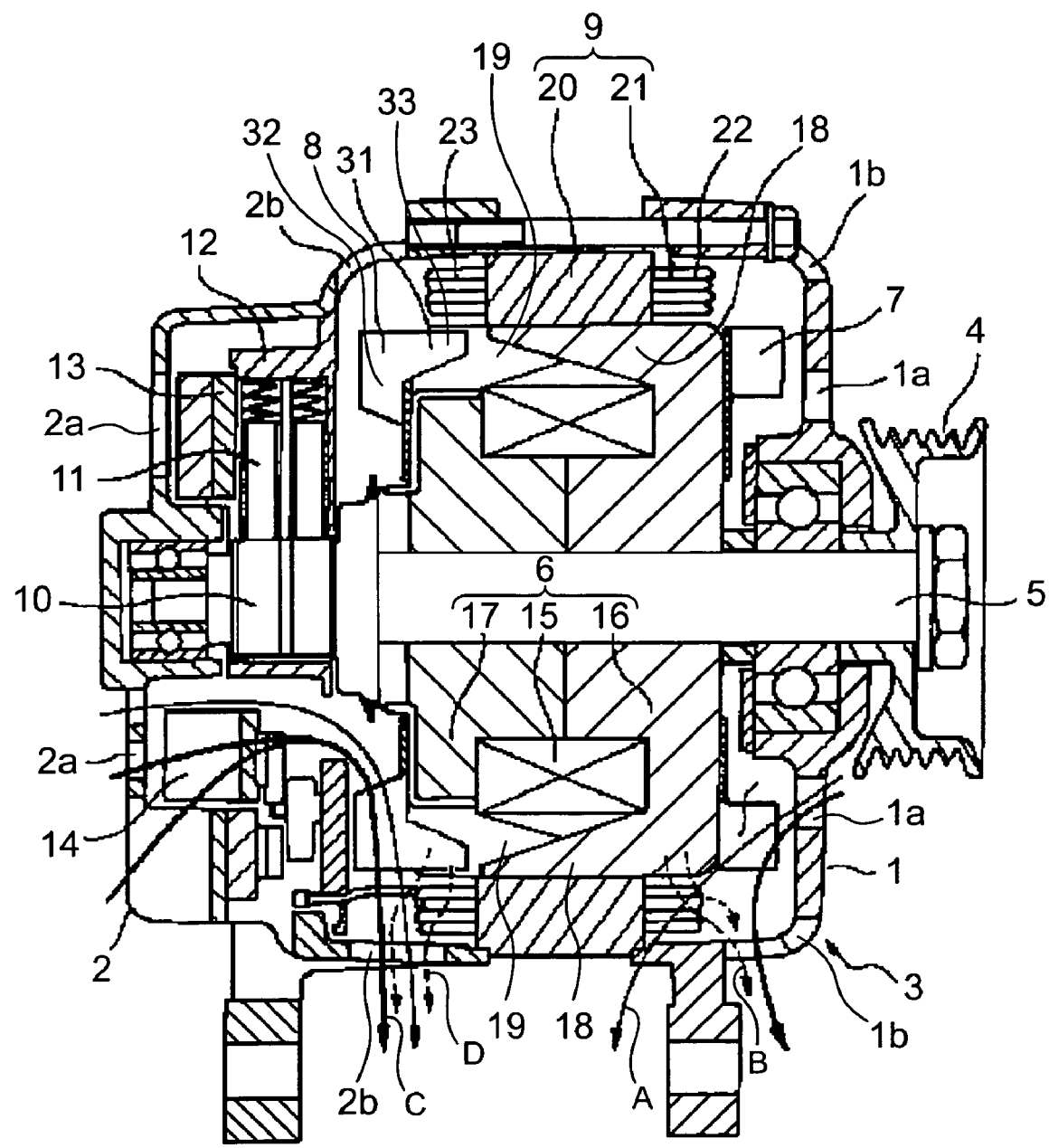
FIG. 1 is a cross section showing an automotive alternator according to Embodiment 1 of the present invention.

Preferred embodiments of the present invention will now be explained based on drawings, and identical or corresponding members and portions in the drawings will be given identical numbering.

Embodiment 1
  FIG. 1 is a cross section showing an automotive alternator according to Embodiment 1 of the present invention.

In an automotive alternator constituting a dynamoelectric machine, a shaft 5 having a pulley 4 fixed to a first end portion is rotatably disposed inside a case 3 constituted by a front bracket 1 and a rear bracket 2 made of aluminum. A Lundell rotor 6 is fixed to the shaft 5. A front-end fan 7 is fixed to a front-end end surface of the rotor 6 near the pulley 4, and a rear-end fan 8 is fixed to a rear-end end surface away from the pulley 4. A stator 9 is fixed to an inner wall surface of the case 3 in a vicinity of the rotor 6 so as to surround the rotor 6.

Slip rings 10 for supplying electric current to the rotor 6 are fixed to a second end portion of the shaft 5. A pair of brushes 11 housed inside a brush holder 12 slide in contact with surfaces of the slip rings 10. A regulator 13 for adjusting magnitude of alternating voltage generated in the stator 9 is fixed to the brush holder 12. A rectifier 14 electrically connected to the stator 9 so as to convert alternating current into direct current is also disposed inside the rear bracket 2.

A plurality of front-end suction apertures 1a are formed on a radially-inner side of the front bracket 1 and a plurality of front-end discharge apertures 1b are formed on a radially-outer side. A plurality of rear-end suction apertures 2a are formed on a radially-inner side of the rear bracket 2, and a plurality of rear-end discharge apertures 2b are formed on a radially-outer side.

The above rotor 6 includes: a rotor coil 15 for generating magnetic flux on passage of electric current; and a pole core disposed so as to cover the rotor coil 15. The pole core includes a front-end pole core body 16 and a rear-end pole core body 17 magnetized into North-seeking (N) poles and South-seeking (S) poles by the magnetic flux. The front-end pole core body 16 and the rear-end pole core body 17 have front-end claw-shaped magnetic poles 18 and rear-end claw-shaped magnetic poles 19, respectively, that are claw-shaped and intermesh with each other. The number of front-end claw-shaped magnetic poles 18 and rear-end claw-shaped magnetic poles 19 is eight each.

The stator 9 includes: a stator core 20 through which a rotating magnetic field from the rotor 6 passes; and a stator coil 21 disposed radially inside the stator core 20. A plurality of slots formed so as to extend axially are disposed at a uniform pitch around an entire circumference radially inside the stator core 20, which is configured by stacking steel sheets.

The stator coil 21 is configured by winding conducting wires continuously into distributed windings so as to be folded over outside the slots at first and second end surfaces of the stator core 20 to form front-end coil ends 22 and rear-end coil ends 23 and alternately occupy an inner layer and an outer layer in a slot depth direction inside the slots at intervals of a predetermined number of slots.

An axial length of the stator core 20 is shorter than an axial length of the pole core.

Figure 2:
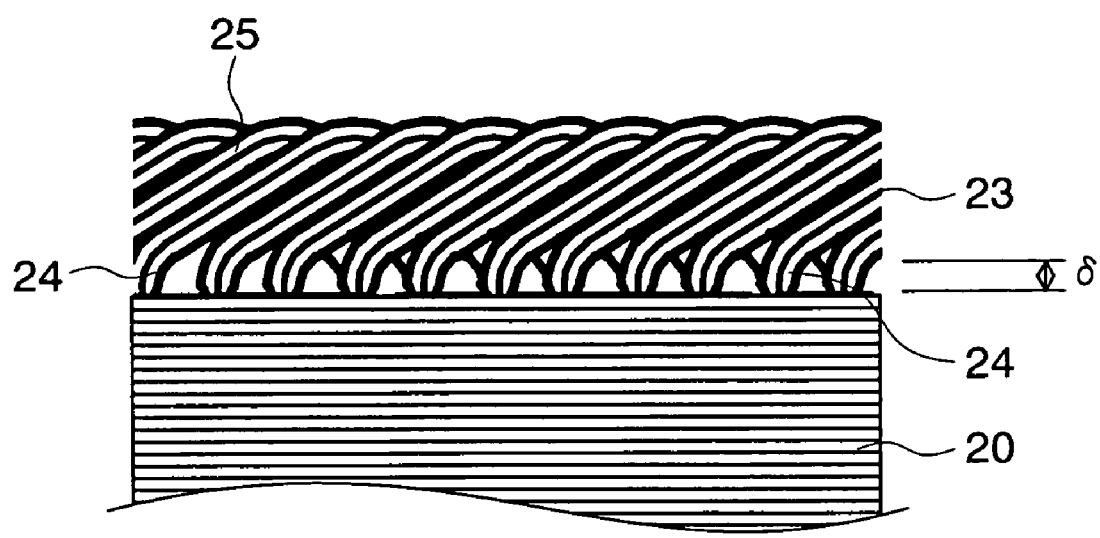
FIG. 2 is a partial enlargement of rear-end coil ends from FIG. 1.

FIG. 2 is a partial enlargement of the rear-end coil ends 23.

Each of the conducting wires constituting the rear-end coil ends 23 is constituted by: straight portions 24 projecting straight outward (axially) from a rear-end end surface of the stator core 20; and crossover portions 25 bent radially and circumferentially, and a space δ is formed above the rear-end end surface of the stator core 20.

Moreover, the front-end coil ends 22 also have a configuration similar to that of the rear-end coil ends 23, and a space δ is also formed above the front-end end surface of the stator core 20.

Figure 3:
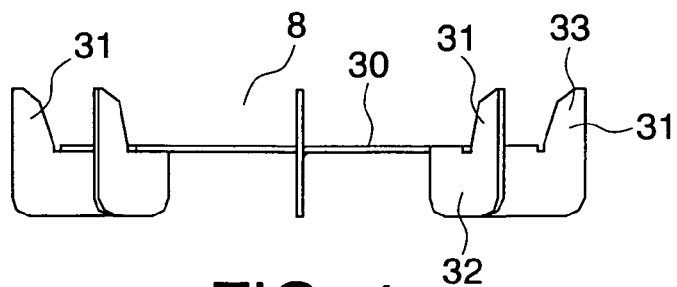
FIG. 3 is a side elevation showing a rear-end fan from FIG. 1.
Figure 4:
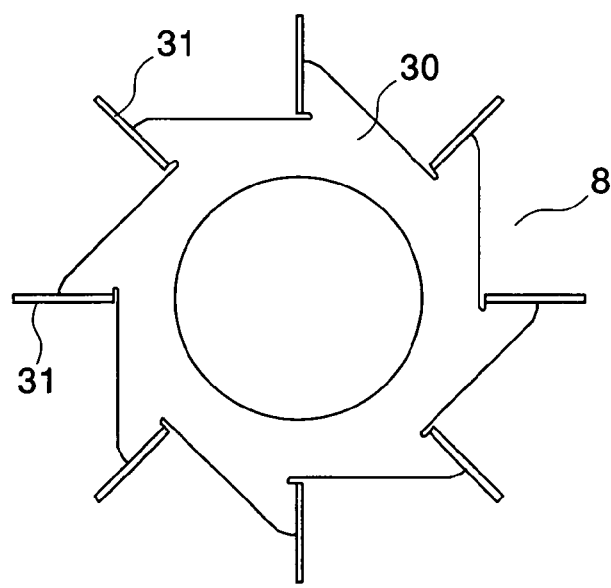
FIG. 4 is a front elevation showing the rear-end fan from FIG. 1 when viewed from a rear bracket side.

FIG. 3 is a side elevation showing the rear-end fan 8 shown in FIG. 1, and FIG. 4 is a front elevation showing the rear-end fan 8 from FIG. 1 when viewed from a rear bracket 2 side.

The rear-end fan 8 is constituted by: a base 30 fixed to the rear-end end surface of the rotor 6; and a plurality of blades 31 disposed so as to extend perpendicular to the base 30. Each of the blades 31 is constituted by: a root portion 32 extending away from the front-end pole core body 16 from an end surface of the rear-end pole core body 17; and a generally triangular interposed portion 33 extending between an adjacent pair of rear-end claw-shaped magnetic poles 19 and 19 and having a truncated leading end.

Figure 5:
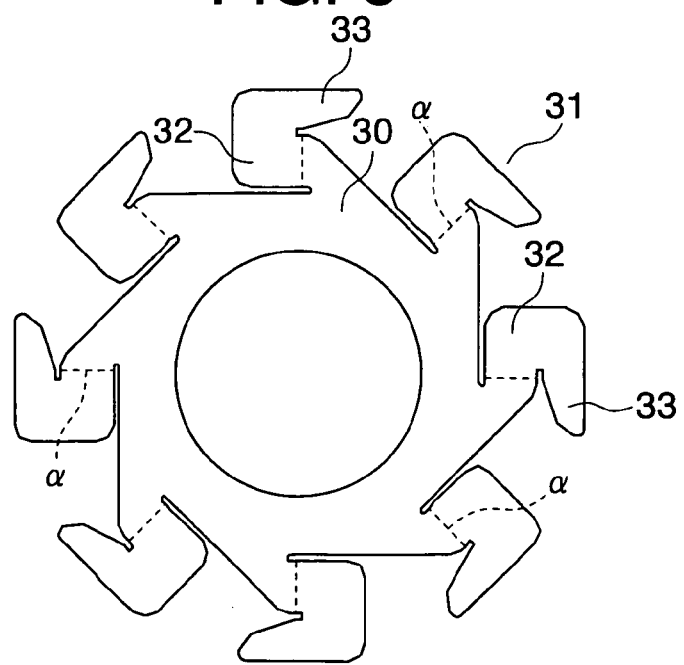
FIG. 5 is a developed projection of the rear-end fan from FIG. 1 before shaping.

FIG. 5 is a developed projection of the above rear-end fan 8 before shaping. The rear-end fan 8 is formed by punching a flat plate constituted by a nonmagnetic material into the shape shown in FIG. 5 and then bending it at 90 degrees at positions indicated by broken lines α in FIG. 5.

Moreover, the front-end fan 7 also has a construction identical to that of the rear-end fan 8, and explanation thereof will be omitted.

In an automotive alternator having the above configuration, electric current is supplied from a battery (not shown) through the brushes 11 and the slip rings 10 to the rotor coil 15, generating a magnetic flux and giving rise to North-seeking (N) poles and South-seeking (S) poles in the front-end and rear-end claw-shaped magnetic poles 18 and 19, respectively.

At the same time, since the pulley 4 is driven by an engine and the rotor 6 is rotated by the shaft 5, a rotating magnetic field is applied to the stator core 20, giving rise to electromotive force in the stator coil 21.

This alternating-current electromotive force passes through the rectifier 14 and is converted into direct current, magnitude thereof is adjusted by the regulator 13, and the battery is charged.

The front-end fan 7 also rotates due to the rotation of the rotor 6, and due to the rotation of the fan 7, air enters through the front-end suction apertures 1a in the front bracket 1, cools the front-end coil ends 22 of the stator coil 21, etc., and is discharged through the front-end discharge apertures 1b, as indicated by arrow A in FIG. 1.

In the front-end fan 7, because the interposed portions of the blades are disposed axially between the pairs of front-end claw-shaped magnetic poles 18 and 18, air between the front-end claw-shaped magnetic poles 18 and 18 is also swept out centrifugally, and that air is also discharged externally through the front-end discharge apertures 1b, as indicated by arrows B in FIG. 1.

The rear-end fan 8 also rotates due to the rotation of the rotor 6, and due to the rotation of the fan 8, air enters through the rear-end suction apertures 2a in the rear bracket 2, cools the rectifier 14, the regulator 13, and the rear-end coil ends 23 of the stator coil 21, etc., and is discharged through the rear-end discharge apertures 2b, as indicated by arrows C in FIG. 1.

In the rear-end fan 8, because the interposed portions 33 of the blades 31 are disposed axially between the pairs of rear-end claw-shaped magnetic poles 19 and 19, air between the rear-end claw-shaped magnetic poles 19 and 19 is also swept out centrifugally, as indicated by arrows D in FIG. 1, and that air is also discharged externally through the rear-end discharge apertures 2b.

In an automotive alternator of the above configuration, because the interposed portions on the blades of the front-end fan 7 are disposed so as to extend between the front-end claw-shaped magnetic poles 18 and 18, the area of the blades is increased and air between the front-end claw-shaped magnetic poles 18 and 18 also flows centrifugally together with rotation of the rotor 6, and as a result, the flow of air over outer peripheral surfaces of the rotor coil 15 becomes active, improving the cooling performance of the rotor coil 15 proportionately. For this reason, the amount of the electric current flowing through the rotor coil 15 can be increased, increasing output current values generated by the stator 9.

Because the interposed portions 33 on the blades 31 of the rear-end fan 8 are disposed so as to extend between the rear-end claw-shaped magnetic poles 19 and 19, the area of the blades 31 is increased and air between the rear-end claw-shaped magnetic poles 19 and 19 also flows centrifugally together with rotation of the rotor 6, and as a result, the flow of air over outer peripheral surfaces of the rotor coil 15 becomes active, improving the cooling performance of the rotor coil 15 proportionately. For this reason, the amount of the electric current flowing through the rotor coil 15 can be increased, increasing output current values generated by the stator 9.

Because straight portions 24 projecting straight outward (axially) from end surfaces of the stator core 20 are disposed on each of the conducting wires in the front-end coil ends 22 and the rear-end coil ends 23, a space δ is formed above the end surface of the stator core 20, reducing air resistance in the coil ends 22 and 23, and increasing the flow rate of air passing through the coil ends 22 and 23. Consequently, radiating characteristics of the stator coil 21 are improved.

Because the blades of the front-end fan 7 and the blades 31 of the rear-end fan 8 are constituted by a nonmagnetic material, magnetic flux is prevented by means of the interposed portions 33 from leaking out anywhere between front-end and rear-end claw-shaped magnetic poles 18 and 19 having opposite poles.

Because the stator coil 21 is configured by winding conducting wires into distributed windings disposed in an orderly manner inside the slots at intervals of a predetermined number of slots, the overall length of the conducting wires can be shortened, reducing electrical resistance of the stator coil 21 proportionately, and enabling output current to be increased.

Because the fans 7 and 8 are formed by bending flat plates, they can be manufactured simply.

Embodiment 2

Figure 6:
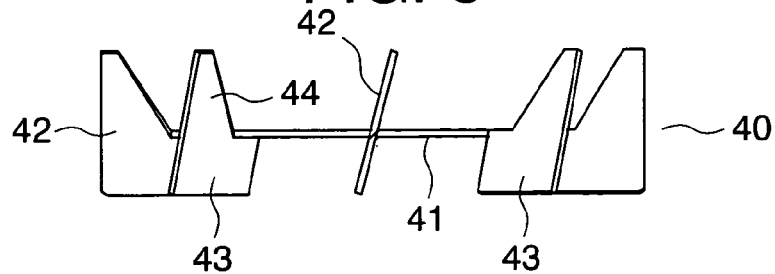
FIG. 6 is a side elevation showing a rear-end fan of an automotive alternator according to Embodiment 2.
Figure 7:
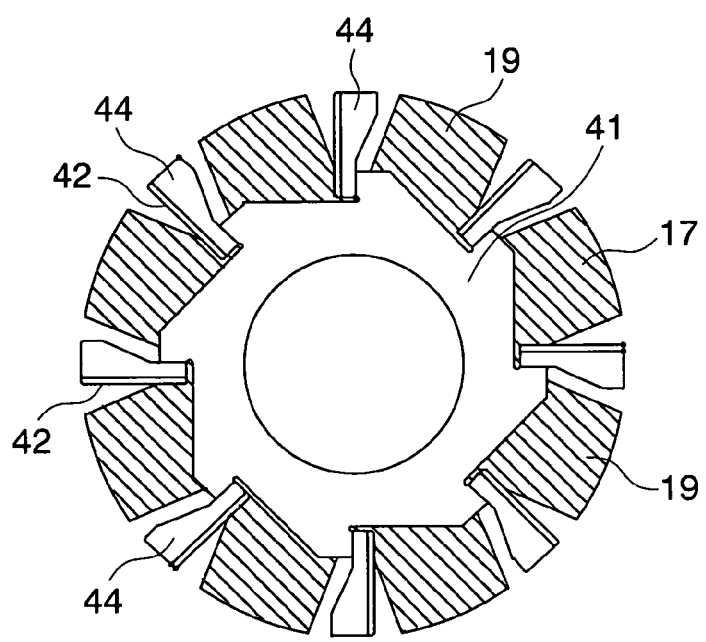
FIG. 7 is a front elevation showing the rear-end fan from FIG. 6 when viewed from a rear bracket side.

FIG. 6 is a side elevation showing a rear-end fan 40 of an automotive alternator according to Embodiment 2 of the present invention, and FIG. 7 is a front elevation showing the rear-end fan 40 from FIG. 6 when viewed from a rear bracket 2.

In this embodiment, a rear-end fan 40 is constituted by: a base 41 fixed to an end surface of a rear-end pole core body 17; and a plurality of blades 42 disposed so as to extend so as to be inclined relative to the base 41. Each of the blades 42 is constituted by: a root portion 43 disposed so as to extend from the base 41; and a generally triangular interposed portion 44 extending between an adjacent pair of rear-end claw-shaped magnetic poles 19 and 19 from the root portion 43 and having a truncated leading end.

Figure 8:
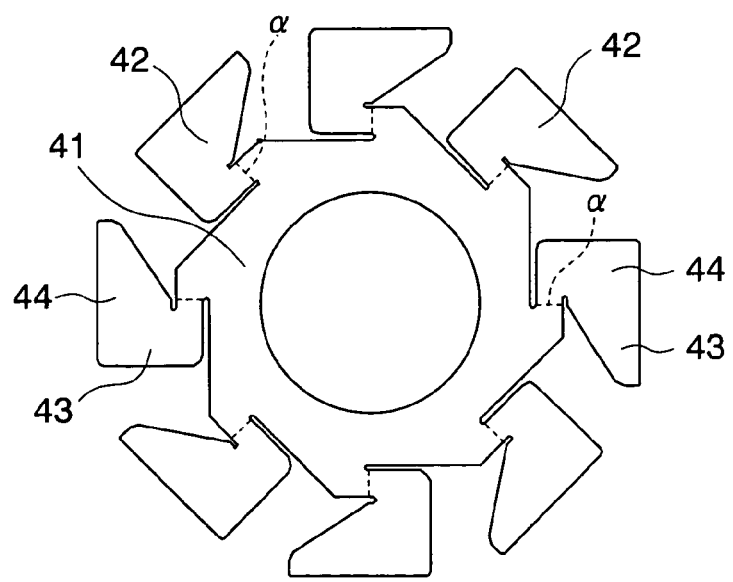
FIG. 8 is a developed projection of the rear-end fan from FIG. 6 before shaping.

FIG. 8 is a developed projection of the above rear-end fan 40 before shaping. The rear-end fan 40 is formed by punching a flat plate constituted by a nonmagnetic material into the shape shown in FIG. 8 and then bending it at acute angles out from the surface of the page at positions indicated by broken lines a in FIG. 8.

Moreover, a front-end fan also has a construction identical to that of the rear-end fan 40, and explanation thereof will be omitted.

The rest of the configuration is similar to that of Embodiment 1.

In an automotive alternator according to Embodiment 2, because the interposed portions 44 of the blades 42 of the rear-end fan 40 project between pairs of the rear-end claw-shaped magnetic poles 19 and 19 toward one of the rear-end claw-shaped magnetic poles 19 and 19, air at an end surface of the rotor 6 flows axially, that is, is led between the rear-end claw-shaped magnetic poles 19 and 19 intentionally, making the flow of air over outer peripheral surfaces of the rotor coil 15 active, thereby improving the cooling performance of the rotor coil 15 proportionately more than that of Embodiment 1.

Moreover, because the front-end fan also has effects identical to those of the rear-end fan 40, explanation thereof will be omitted.

Embodiment 3

Figure 9:
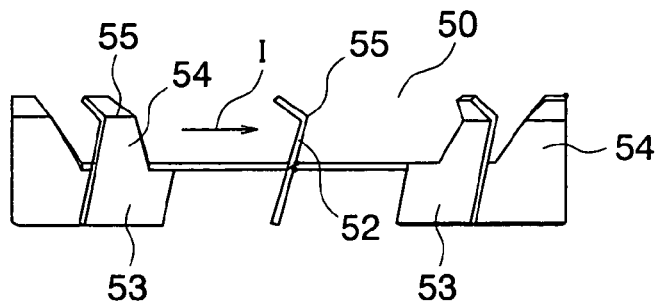
FIG. 9 is a side elevation showing a rear-end fan of an automotive alternator according to Embodiment 3.
Figure 10:
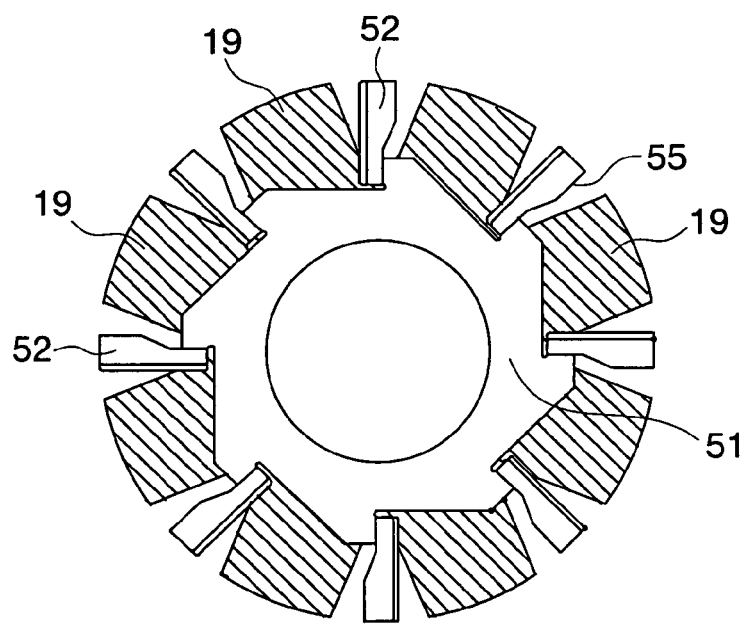
FIG. 10 is a front elevation showing the rear-end fan from FIG. 9 when viewed from a rear bracket side.

FIG. 9 is a side elevation showing a rear-end fan 50 of an automotive alternator according to Embodiment 3 of the present invention, and FIG. 10 is a front elevation showing the rear-end fan 50 from FIG. 9 when viewed from a rear bracket 2.

In this embodiment, a rear-end fan 50 is constituted by: a base 51 fixed to an end surface of a rear-end pole core body 17; and a plurality of blades 52 disposed at a uniform pitch circumferentially around the base 51. Each of the blades 52 is constituted by: a root portion 53 disposed so as to extend from the base 51; and a generally triangular interposed portion 54 extending between an adjacent pair of rear-end claw-shaped magnetic poles 19 and 19 from the root portion 53 and having a truncated leading end. The interposed portions 54 are bent at a bent portion 55 at an intermediate portion so as to have an angular shape. Spaces 6 above end surfaces of a stator core 20 are disposed radially outside the bent portions 55.

Figure 11:
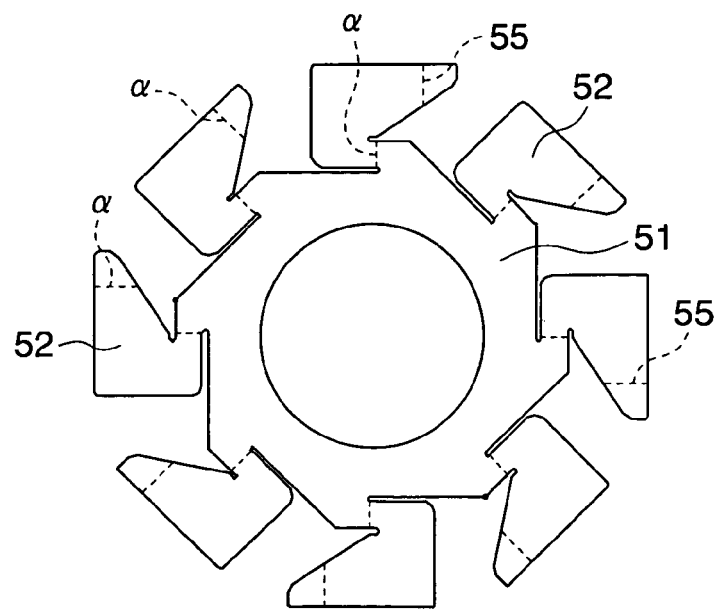
FIG. 11 is a developed projection of the rear-end fan from FIG. 9 before shaping.

FIG. 11 is a developed projection of the above rear-end fan 50 before shaping. The rear-end fan 50 is formed by punching a flat plate constituted by a nonmagnetic material into the shape shown in FIG. 11, bending it at acute angles out from the surface of the page at positions indicated by broken lines a in FIG. 11, and then bending it in toward the surface of the page at the bent portions 55 of the interposed portions 54.

Moreover, a front-end fan also has a construction identical to that of the rear-end fan 50, and explanation thereof will be omitted.

The rest of the configuration is similar to that of Embodiment 1.

In an automotive alternator according to Embodiment 3, because the blades 52 of the rear-end fan 50 are bent so as to have an angular shape, when air from the direction of arrow I in FIG. 9 contacts the blades 52 together with rotation of the rotor 6, much of the air is gathered into the bent portions 55 and advances centrifugally so as to pass through the spaces δ above the end surface of the stator core 20 and be discharged externally through the rear-end discharge apertures 2b. Consequently, the flow rate of air passing through the coil ends 23 increases, improving the radiating characteristics of the stator coil 21 in particular.

Moreover, because the front-end fan also has effects identical to those of the rear-end fan 50, explanation thereof will be omitted.

Embodiment 4

Figure 12:
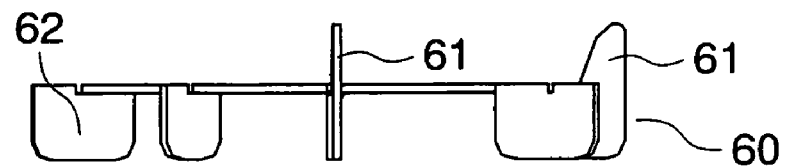
FIG. 12 is a side elevation showing a rear-end fan of an automotive alternator according to Embodiment 4.
Figure 13:
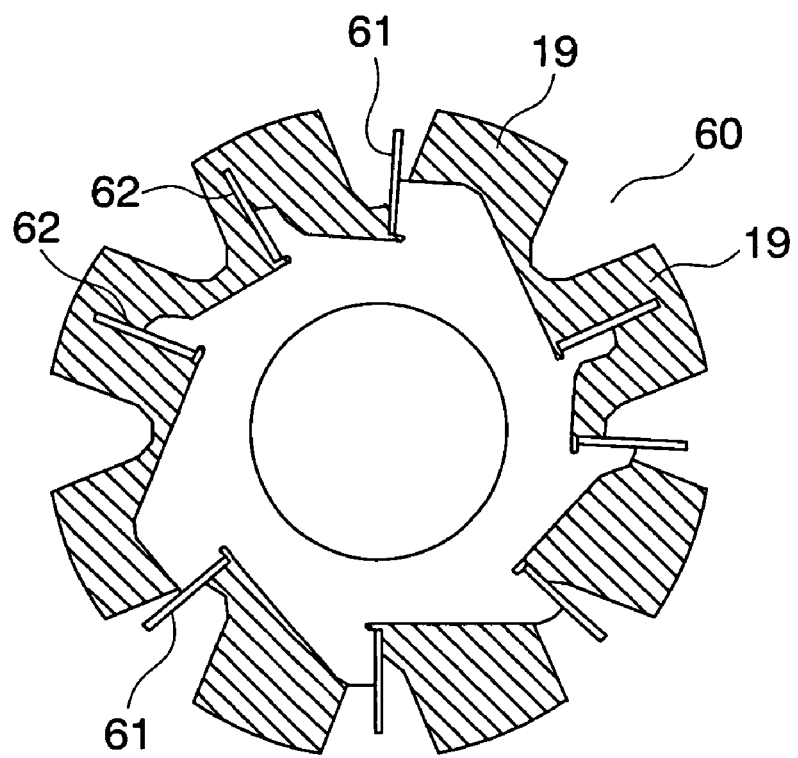
FIG. 13 is a front elevation showing the rear-end fan from FIG. 12 when viewed from a rear bracket side.

FIG. 12 is a side elevation showing a rear-end fan 60 of an automotive alternator according to Embodiment 4 of the present invention, and FIG. 13 is a front elevation showing the rear-end fan 60 from FIG. 12 when viewed from a rear bracket 2.

In an automotive alternator according to Embodiment 4, first and second blades 61 and 62 are disposed at a nonuniform pitch circumferentially, the first blades 61, which are positioned between pairs of rear-end claw-shaped magnetic poles 19, have a similar shape to that of the blades 31 according to Embodiment 1, and the second blades 62, which are not positioned between pairs of rear-end claw-shaped magnetic poles 19, in other words, which face the rear-end claw-shaped magnetic poles 19, are rectangular blades.

Moreover, a front-end fan also has a construction identical to that of the rear-end fan 60, and explanation thereof will be omitted.

The rest of the configuration is similar to that of Embodiment 1.

In an automotive alternator having the above configuration, because the blades 61 and 62 are disposed at a nonuniform pitch circumferentially, vibrational effects are suppressed, reducing noise occurring due to the rotation of the rear-end fan 60. Because the interposed portions on the first blades 61 of the rear-end fan 60 are disposed so as to extend between pairs of rear-end claw-shaped magnetic poles 19 and 19, air between the rear-end claw-shaped magnetic poles 19 and 19 also flows centrifugally together with rotation of the rotor 6, and as a result, the flow of air over outer peripheral surfaces of the rotor coil 15 becomes active, improving the cooling performance of the rotor coil 15 proportionately.

Moreover, because the front-end fan also has effects identical to those of the rear-end fan 60, explanation thereof will be omitted.

Moreover, in each of the above embodiments, explanations have been given for automotive alternators, but the present invention can also be applied to other alternating-current generators driven to rotate using an internal combustion engine other than a vehicle-mounted engine, or an electric motor, a water wheel, etc., as a driving source.

The present invention can also be applied to any electric motor constituting a dynamoelectric machine in which a rotor is rotated by passing electric current to a stator coil to generate a rotating magnetic field in the stator coil.

In each of the above embodiments, the fans 7, 8, 40, 50, and 60 are constituted by a non-magnetic material, but of course the fans may also be made of iron.

In that case, because the blades are constituted by a magnetic material, there is a risk that magnetic flux may flow through the. interposed portions anywhere between opposite claw-shaped magnetic poles. In answer to this, such magnetic flux leakage can be prevented by setting distances between the interposed portions and adjacent claw-shaped magnetic poles so as to be greater than a distance between an inner peripheral surface of the stator core and an outer peripheral surface of the rotor.

Heat-generating members can be cooled more effectively by fixing a fan having interposed portions only to an end surface of a pole core near a rectifier.

In each of the above embodiments, cases in which fans 7, 8, 40, 50, and 60 were fixed to end surfaces of a pole core have been explained, but a fan needs only to rotate together with a rotor, and may also be fixed to a shaft, for example.

The invention claimed is:

1. A dynamoelectric machine comprising:
    a case having a suction aperture for sucking in air and a discharge aperture for discharging said air;
    a rotor including:
        a rotor coil disposed so as to be fixed to a shaft inside said case, said rotor coil generating magnetic flux on passage of electric current; and
        a Lundell pole core disposed so as to cover said rotor coil, said pole core having a plurality of claw-shaped magnetic poles that are magnetized by said magnetic flux;
    a stator including:
        a stator core disposed so as to surround said rotor; and
        a stator coil formed by winding a conducting wire into slots extending axially on said stator core;
    a fan rotating together with said rotor, said fan directing said air from said suction aperture into said case, blowing said air centrifugally, and discharging said air externally through said discharge aperture,
    said pole core being constituted by a first pole core body and a second pole core body in which said claw-shaped magnetic poles intermesh with each other alternately, wherein:
    said fan has a blade including an interposed portion extending axially from an end surface of said pole core between an adjacent pair of said claw-shaped magnetic poles
    wherein the interposed portion is bent at a bent portion so as to have an angular shape.

2. The dynamoelectric machine according to claim 1, wherein:
    said stator coil is wound into a distributed winding in which said conducting wire is disposed in a orderly manner inside said slots at intervals of a predetermined number of slots.

3. The dynamoelectric machine according to claim 1, wherein:
    a coil end is formed in said stator coil by folding said conducting wire over outside an end surface of said stator core; and
    a space is formed in said coil end above said end surface by said conducting wire having straight portions projecting axially outward from said end surface.

4. The dynamoelectric machine according to claim 1, wherein:
    said interposed portion of said blade projects toward one of said claw-shaped magnetic poles in said adjacent pair of claw-shaped magnetic poles.

5. The dynamoelectric machine according to claim 1, wherein:
    said fan is formed by bending a flat plate.

6. The dynamoelectric machine according to claim 1, wherein:
    said fan is made of iron; and
    a distance between said interposed portion and said adjacent pair of claw-shaped magnetic poles is greater than a distance between an inner peripheral surface of said stator core and an outer peripheral surface of said rotor.

7. The dynamoelectric machine according to claim 1, wherein:
    said fan is constituted by a nonmagnetic material.

8. The dynamoelectric machine according to claim 1, wherein:
    blades of said fan are disposed at a nonuniform pitch circumferentially; and a blade disposed between an adjacent pair of said claw-shaped magnetic poles has said interposed portion.

9. The dynamoelectric machine according to claim 1, wherein:
said fan is fixed only to an end surface of said pole core near a rectifier for converting alternating current generated in said stator into direct current.

10. The dynamoelectric machine according to claim 1, wherein the interposed section extends axially between said adjacent pair of claw shaped magnetic poles and over said rotor coils.

11. The dynamoelectric machine according to claim 1, wherein said blade comprises a root section disposed so as to exend from the end surface of said pole core and the interposed section that extends between the adjacent pair of claw shaped magnetic poles.

12. The dynamoelectric machine according to claim 1, wherein the fan comprises first and second blades, each comprising the interposed portion that extends axially between the adjacent pair of said claw-shaped magnetic poles and wherein each of the pair of claw shaped magnetic poles extend between the interposed section of the first blade and the interposed section of the second blade.

13. The dynamoelectric machine according to claim 12, wherein the interposed section of each of the first and second blades and the pair of claw shaped magnetic poles extend in a substantially same direction.

14. The dynamoelectric machine according to claim 1, wherein the interposed section extends between the adjacent pair of claw shaped magnetic poles without contacting the adjacent pair of claw shaped magnetic poles.

15. The dynamoelectric machine according to claim 1, wherein spaces formed in said coil end above said end surface are disposed radially outside the bent portions.

16. The dynamoelectric machine according to claim 1, wherein the bent portion of the interposed portion is bent at an acute angle.

* * * * *